United States Patent [19]

Graffin

[11] Patent Number: 4,582,101

[45] Date of Patent: Apr. 15, 1986

[54] DEVICE FOR FILLING A RECEPTACLE

[75] Inventor: Jean-Jacques Graffin, La Ferte Bernard, France

[73] Assignee: Etablissements A. Bertaud, Vitrolles, France

[21] Appl. No.: 592,090

[22] Filed: Mar. 22, 1984

[30] Foreign Application Priority Data

Mar. 25, 1983 [FR] France ............... 83 04951

[51] Int. Cl.⁴ .............................................. B65B 3/28
[52] U.S. Cl. ................................................. 141/83
[58] Field of Search ............... 141/1, 9, 83, 128, 101, 141/153

[56] References Cited

U.S. PATENT DOCUMENTS 3,648,741 3/1972 Croasdale et al. .............. 141/9

Primary Examiner—Stephen Marcus
Assistant Examiner—Mark Thronson
Attorney, Agent, or Firm—Cushman, Darby & Cushman

[57] ABSTRACT

A device for carrying out a volumetric metering step with which is associated a weight metering step providing a finishing of the filling. The device comprises a hopper (12) divided in two by a grid (21) and arranged to feed selectively a volumetric metering device (13) or directly the receptacle through the intermediacy of a distributor with a stopcock plug (14).

4 Claims, 3 Drawing Figures

DEVICE FOR FILLING A RECEPTACLE

FIELD OF THE INVENTION

The present invention relates to a process and a device for filling a receptacle and more precisely a device for filling capable of transferring from a storage container to a receptacle predetermined puantities of products of more or less high viscosity, homogeneous or not.

In a number of industries, such as the agricultural and food, petroleum, pharmaceutical or chemical industries, it is often necessary to undertake the packaging of predetermined quantities of liquid or pasty, homogeneous or heterogeneous products intended for sale, this packaging requiring the transfer of products of more or less high viscosity from a storage container to a receptacle such as a bottle, a jar, a can or the like. The filling of these receptacles is generally carried out in series, with the aid of machines incorporating at least one filling station supplied by at least one storage container, the receptacles passing one after another in front of the filling station at a determined rate.

To comply with regulations, it is necessary to establish accurately the quantity of product allowed to enter each receptacle. In particular, in the case of serial filling, it is necessary that quantities of products allowed to enter all the receptacles correspond to a stated volume or weight, this volume of this weight being capable of appearing on a label affixed to each receptacle. In fact, if the volume or the weight is lower than that stated, the producer incurs administrative sanctions for noncompliance with the regulations, or civil and penal sanctions on the part of the consumers for deception in respect of the quantities sold. If, on the contrary, the volume or the weight is greater than that stated, the producer is subjected to a profit loss since the filled receptacle is sold at a fixed price anyway and the excess product is therefore lost to him.

PRIOR ART

It is known in particular to employ volumetric devices for filling receptacles, the volume to be introduced into the receptacle being then measured by the size of the chamber of a suction-and-delivery pump. For the measurement of the volumes mention can be made in particular of the measurement of the stroke of a piston moving in a jacket or the number of revolutions carried out by a pump of the impeller, paddle, or diaphragm type or by a peristaltic pump.

Weight-metering devices are known, moreover, comprising balances on which the receptacles are arranged during the filling and a control system interrupting the filling when the required quantity of products is reached. The most sophisticated machines of this type now make it possible to enter accurately in a memory the weight of the empty receptacle and to make a correction to the nozzle pressure so that the net weight of products introduced into the receptacle can be measured with a high accuracy.

It is also generally accepted that the weight-metering devices and the volumetric metering devices are completely incompatible because they do not measure the same quantities, and at present there is no machine in existence which has combined volumetric metering and weight metering in order to obtain the maximum accuracy whatever the product to be packaged.

Problems arise, however, with each of these devices. In particular, when the regulations impose a filling of the receptacle by weight, and when a volumetric metering device is employed, there is a danger of error if the product is not homogeneous in density, the variations of density being incapable of being compensated by the volumetric metering device since, by definition, the latter measures a volume.

On the other hand, the weight metering devices existing at present generally do not make it possible to package heterogeneous products such as for example jams containing pieces of fruit or, in general, fluid products containing solid particles of a significant size. In practice, for such products, the producers are therefore obliged to employ filling machines with volumetric metering, oversizing the volume introduced into the receptacle in order to ensure that the regulations are obeyed. As observed earlier, such a practice leads to higher costs resulting from the excess quantities of products introduced.

SUMMARY OF THE INVENTION

An object of the present invention is to provide a process and a device which, while making it possible to ensure that the receptacle does contain the desired quantity of products, at the same time ensure a highly accurate measurement of this quantity in order to reduce to the minimum the excess of product in the receptacle, in particular in the case of non-homogeneous products and hence products of a generally variable density.

For this purpose, there is provided, according to the present invention, a process for filling a receptacle incorporating a volumetric metering step with a weight metering step combined therewith.

According to a more particular characteristic of the invention, the weight metering takes place after the volumetric metering and serves as finishing metering.

According to another particular characteristic of the process according to the invention, provision is made, before the volumetric metering, for a measurement of the weight of the empty receptacle and entering of this weight in a memory in order to be able to obtain a highly accurate net weighing during the finishing weight metering.

For carrying out this process, there is provided according to the invention a device for filling receptacles incorporating at least one device for volumetric metering, at least one feed hooper and at least one filling spout which are combined with at least one device for weight metering and at least one means for controlling the device for weight metering associated with the operation of the device for volumetric metering.

According to a particular characteristic of the invention, the means for control of the device for weight metering incorporates a means of distribution permitting the filling spout to be coupled selectively to the device for volumetric metering or to a feed hopper, the means of distribution being moreover capable of being produced to permit the feed hopper to be coupled selectively to the device for volumetric metering.

According to yet another characteristic of the present invention, the feed hopper is a single hopper divided by a perforated partition making it possible to keep on one side a heterogeneous product and to select from the other side of the partition a homogeneous product, the side containing the heterogeneous product being capable of being coupled to the device for volumetric metering while the side containing the homogeneous product is capable of being coupled to the device for weight metering.

BRIEF DESCRIPTION OF THE DRAWINGS

Other characteristics and advantages of the present invention will become more apparent from the reading of the following description made in conjunction with the drawings attached herewith, in which.

DETAILED DESCRIPTION

Figure 1:
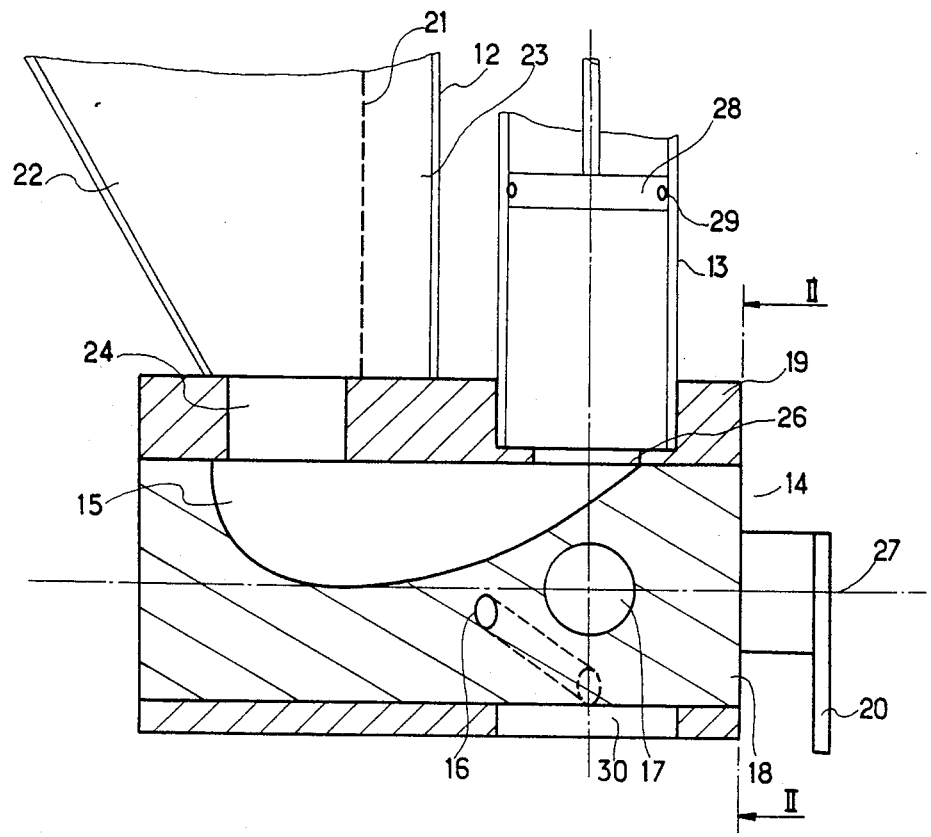
FIG. 1 is a diagrammatic view in section along the line I—I of FIG. 2 of the selective feed device of the filling machine which is the subject of the invention, the device for distribution of the filling products being in a position permitting the product to enter the device for volumetric metering.

FIG. 1 shows a diagrammatic view of the filling station of the machine which is the subject of the invention, which comprises essentially a hopper for feeding the filling product 12, a device for volumetric metering 13 and a distributor 14 comprising a body 19 and a stopcock plug 18 inside the body 19. The stopcock plug has three separate channels 15, 16 and 17 and is capable of rotating inside the body 19. A control lever 20 fixed to the stopcock plug makes it possible to turn the latter inside the body 19 around its principal axis 27 as a function of the instructions delivered by a suitable control device, not shown, for example an electric or pneumatic device.

The hopper 12 comprises two parts separated by a grid 21. The first part 22 is intended to hold a non-homogeneous filling product, while the part 23 collects a homogeneous phase of the filling product by virtue of the filtering action carried out by the grid 21.

The body 19 of the distributor comprises in its upper part a first channel 24 opening out at its upper part into the bottom of the part 22 of the hopper 12 and at its lower part on the inner surface of the body 19. A second vertical cylindrical channel 25 (see FIG. 2) provided in the upper part of the body 19 opens out at its upper part into the bottom of the part 23 of the hopper 12 and at its lower part on the inner face of the body of the distributor. A third vertical channel 26 provided in the upper part of the body of the distributor opens out at its upper part into the bottom of the cylinder 13 of the device for volumetric metering and at its lower part on the inner face of the body of the distributor.

A piston 28 provided with a sealing device 29 such as a ring seal is capable of moving vertically inside the cylinder 13 of the device for volumetric metering. The cylinder 13 is encased in a cylindrical bore formed in the upper part 19 of the body of the distributor.

The lower part of the body 19 of the distributor has an opening 30 arranged vertically to the cylinder of the device and to the receptacle to be filled.

A channel 15 is provided in the stopcock plug 18 generally parallel to the axis of the latter and is in the shape of a cavity comprising two parallel plane walls connected by a rounded bottom. The plane walls of the cavity 15 are situated on either side of a plane of symmetry of the cavity 15, which contains the axis 27 of the stopcock plug, and coincide substantially with the diameter of the channel 26 when the stopcock plug is in the position shown in FIG. 1 in order to permit a coupling between the part 22 of the hopper 12 and the device for volumetric metering 13.

A channel 16 passes through the stopcock plug 18 so as to connect the vertical channel 25 and the opening 30 when the stopcock plug 18 is in an appropriate angular position relative to the body 19. A channel 17 passes through the stopcock plug 18 so as to connect the vertical channel 26 and the opening 30 when the stopcock plug is in an appropriate angular position relative to the body 19 of the distributor. The diameter of the channel 17 and the separation between the rounded bottom of the cavity 15 and the axis 27 of the stopcock plug are such that there is no communication between the channel 17 and the cavity 15.

Figure 2:
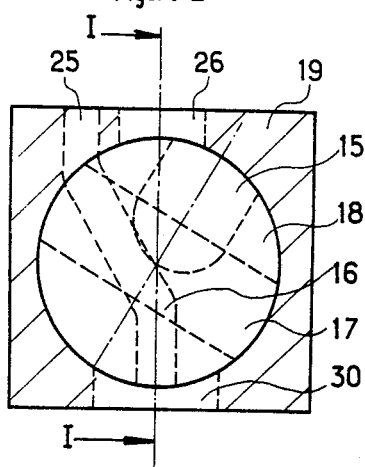
FIG. 2 shows a diagrammatic view in section along the line II—II of FIG. 1, the device for distribution being in the position for the finishing weight metering, the feed hopper and the device for volumetric metering not being shown.

As can be seen in FIG. 2, the respective positions of the channels 15, 16 and 17 in the stopcock plug 18 are such that in a first angular position of the stopcock plug 18 in the body 19 of the distributor the vertical channels 24 and 26 are connected through the intermediacy of the cavity 15, in a second angular position of the stopcock plug 18 the opening 30 is connected to the vertical channel 25, and in a third angular position of the stopcock plug 18 the opening 30 is connected to the vertical channel 26 and the cylinder of the device for volumetric metering.

Figure 3:
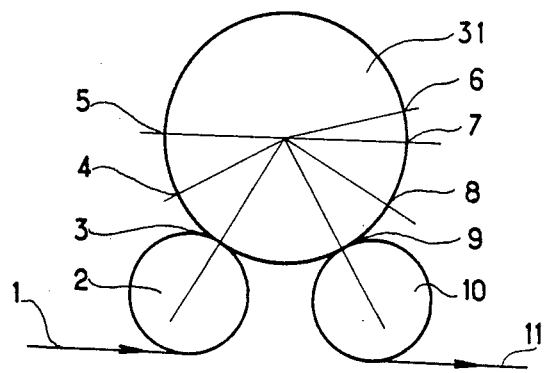
FIG. 3 is a diagram showing the various steps of the process according to the invention.

FIG. 3 shows a diagram indicating schematically the various parts of the path of the receptacles to be filled during a filling cycle. In a conventional manner, the receptacles to be filled are routed towards the filling station by a conveying device known per se during a first part of the path 1, then they are introduced onto a filling tray 3 by a known means of transfer such as a star feeder 2. The filling tray being driven in rotation, a given receptacle will first follow a first circular arc included between its entry point 3 on the tray and a point 4. A second part of the path, between the points 4 and 5, is used to carry out the taring of the weighing device, which is reset to zero for each receptacle by means known per se.

During this time the stopcock plug of the distributor is in the position shown in FIG. 1, that is to say that it permits the induction of a portion of filling product, from the product storage container towards the device for volumetric metering.

When the receptacle reaches the point 5, a suitable control device connected to the filling tray controls the rotation of the stopcock plug of the distributor, which connects the previously filled volumetric metering device with the filling opening 30, the filling taking place under the pressure of the piston of the volumetric metering device, which presses the portion of product previously admitted into the cylinder towards the receptacle to be filled.

The filling phase with volumetric metering extends until the receptacle arrives at the point 6. The distributor then breaks the communication between the volumetric metering device containing the heterogeneous product and the receptacle, by a rotation of the stopcock plug controlled by a suitable device acting on the lever 20.

A filling phase with weight metering then ensues, the receptacle to be filled continuing on its path between the points 6 and 7. The weight metering therefore intervenes solely as a supplement to the volumetric metering carried out previously, the stopcock plug 18 being then in the position which couples the opening 25 directly with the opening 30 forming a filling spout.

It will be noted in this connection that there is no point in describing here in detail the device for weight metering since the latter is known per se. Use can be made, in particular, of a series of balances transmitting a signal proportional to the weight on the pan of each balance, each signal being processed by a microprocessor with access to a memory in which the weight of the empty receptacle was entered during the path 4-5 of the receptacle.

The updating of the microprocessor settings takes place at the instant of the final checking of the weight of the filled receptacle, the latter then traveling along the path situated between the points 7 and 8. This checking phase makes it possible to know the final weight of the filled receptacle. If the latter is incorrect, the electronic control device will remove the receptacle or will simply make the correction for the following turn.

The final weighing phase also makes it possible to detect, and if appropriate to separate from the filling line, the receptacles with a sealing fault, whose weight is found to be unstable during this phase.

A suitable display device makes it possible to display at will the weight of each filled receptacle or, in a cyclic manner, the weight of some receptacles only.

The receptacle filled with the desired weight of the product finally reaches the point 9 where its discharge towards a subsequent work station such as a closing station is ensured by the intermediacy of a suitable transfer device 10 connected to a conveying means 11.

Although a single hopper 12 for the filling product has been shown and described, comprising a separating grid determining a hopper part containing a heterogeneous phase of the filling product and a hopper part containing a homogeneous phase of the filling product, it is also possible to provide for two separate storage containers, one containing a first filling product and the other containing a second filling product intended to complete the filling of a receptacle to adjust the weight of product contained in the receptacle.

Moreover, although a device for volumetric metering has been described and shown which incorporates a cylinder in which a piston moves, it is also possible to employ for the volumetric metering any other means permitting the handling of a non-homogeneous filling product, in particular a pump of the impeller, vane, or diaphragm type, or a peristaltic pump.

Moreover, although a 3-position distributor incorporating a stopcock plug has been described, it is also possible to use, for connecting selectively the storage container or containers for filling products, the device for volumetric metering and an opening of the receptacle to be filled, a distributing device incorporating a means for guiding and interrupting flow other than a stopcock plug, such as a valve of the port, slide or flap type.

In addition, the interruption of the flow of homogeneous filling product, at the end of the weight metering, can be ensured not by the stopcock plug itself, but instead by an additional device situated upstream of the stopcock plug.

Finally, although the present description relates to a filling and metering unit incorporating a distributor, it is obvious that it is possible to envisage, in order to increase the output of a filling and metering machine employing such a device, equipping the machine with a plurality of metering and filling units such as described earlier, each unit comprising a distributor controlled by a suitable electronic or pneumatic device connected to a computer taking into account the operating parameters relating to each filling and metering unit.

The present invention is not restricted to the examples of embodiment which have just been described; on the contrary, it is capable of modifications and alternative forms which will occur to the expert.

What is claimed is:

1. A device for filling receptacles comprising a filling unit mounted for movement on a closed looped path, said path having an entry point where an empty receptacle is placed on said filling unit, and a discharge point where a filled receptacle is discharged from said device, said unit comprising a first and a second feed hopper, one filling spout, a volumetric metering member, a weight measuring means, a distribution means having a first position where said volumetric metering member is connected to said first hopper, a second position where said volumetric metering member is connected to said filling spout, and a third position where said filling spout is connected to said second hopper, and controlling means connected to said weight measuring means for switching said distribution means from said first position to said second position, and from said second position to said third position, in conjunction with said volumetric metering member, and for switching said distribution means out of said third position upon a signal received from said weight measuring means.

2. A device claimed in claim 1 wherein said volumetric metering member comprises a cylinder with a piston movable therein, wherein said device includes an aperture at an end of said cylinder, wherein said aperture is connected to said distribution means, and wherein said piston is movable towards and away from said aperture, said piston being operated for moving from said aperture when said distribution means are in said first position.

3. A device as claimed in claim 1 wherein said closed looped path is circular.

4. A device for filling receptacles comprising a filling unit mounted for movement on a closed looped path, said path having an entry point where an empty receptacle is placed on said filling unit, and a discharge point where a filled receptacle is discharged from said device, said unit comprising a first and a second feed hopper, a filling spout, a volumetric metering member, a weight metering means, a distribution means having a first position where said volumetric metering member is connected to said first hopper, a second position where said volumetric metering member is connected to said filling spout, and a third position where said filling spout is connected to said second hopper, said first and second hopper being in communication through a perforated partition for allowing liquid matter to pass through from one hopper into the other hopper.

* * * * *